(12) United States Patent
Jarman

(10) Patent No.: US 8,776,100 B2
(45) Date of Patent: Jul. 8, 2014

(54) METHOD AND APPARATUS FOR LOGGING AND REPORTING TELEVISION VIEWING

(75) Inventor: Matthew T. Jarman, Salt Lake City, UT (US)

(73) Assignee: ClearPlay, Inc., Salt Lake City, UT (US)

( * ) Notice: Subject to any disclaimer, the term of this patent is extended or adjusted under 35 U.S.C. 154(b) by 0 days.

(21) Appl. No.: 12/841,978

(22) Filed: Jul. 22, 2010

(65) Prior Publication Data

US 2010/0293568 A1  Nov. 18, 2010

Related U.S. Application Data

(63) Continuation of application No. 11/625,071, filed on Jan. 19, 2007, now abandoned.

(60) Provisional application No. 60/760,159, filed on Jan. 19, 2006.

(51) Int. Cl.
*H04H 60/33*  (2008.01)

(52) U.S. Cl.
USPC ............ 725/9; 725/25; 725/46; 725/51

(58) Field of Classification Search
USPC ................... 725/25–31, 9, 11, 14
See application file for complete search history.

(56) References Cited

U.S. PATENT DOCUMENTS

| | | | |
|---|---|---|---|
| 6,166,780 A * | 12/2000 | Bray | 348/632 |
| 6,701,523 B1 * | 3/2004 | Hancock et al. | 725/25 |
| 6,922,843 B1 * | 7/2005 | Herrington et al. | 725/30 |
| 6,983,478 B1 * | 1/2006 | Grauch et al. | 725/13 |
| 7,185,355 B1 * | 2/2007 | Ellis et al. | 725/46 |
| 7,269,838 B1 * | 9/2007 | Boyer et al. | 725/51 |
| 2003/0103627 A1 * | 6/2003 | Nierzwick et al. | 380/240 |
| 2004/0128686 A1 * | 7/2004 | Boyer et al. | 725/51 |
| 2005/0028191 A1 * | 2/2005 | Sullivan et al. | 725/28 |
| 2005/0028208 A1 * | 2/2005 | Ellis et al. | 725/58 |
| 2005/0251827 A1 * | 11/2005 | Ellis et al. | 725/47 |
| 2006/0218575 A1 * | 9/2006 | Blair | 725/28 |
| 2006/0277564 A1 * | 12/2006 | Jarman | 725/25 |
| 2006/0294548 A1 * | 12/2006 | Potrebic et al. | 725/46 |

* cited by examiner

*Primary Examiner* — Jun Fei Zhong
(74) *Attorney, Agent, or Firm* — Polsinelli PC

(57) ABSTRACT

A multimedia logging and reporting system and method involves first obtaining some viewing information about a multimedia presentation such as a television program. The viewing information may be a name of the program and the time it was being watched on the television or may include other information depending on the multimedia, the device used for viewing the multimedia as well as other factors. The viewing information is recorded and then used to generate a viewing report, an example being a display on a television screen that lists a particular user, the time and name of the programs watched on any given day.

30 Claims, 5 Drawing Sheets

METHOD AND APPARATUS FOR LOGGING AND REPORTING TELEVISION VIEWING

CROSS REFERENCE TO RELATED APPLICATIONS

This is a continuation of U.S. Utility application Ser. No. 11/625,071 filed Jan. 19, 2007, which is a non-provisional application claiming priority under 35 U.S.C. §119(e) to copending provisional application No. 60/760,159 titled "Apparatus and Method for Logging and Reporting Television Viewing," the entire contents of each of which are incorporated herein by reference.

FIELD OF THE INVENTION

Aspects of the present invention involve a system, method, apparatus, and computer program products for logging and reporting television viewing habits.

BACKGROUND

It is often the case that parents desire to understand their children's television viewing, movie viewing, video game playing, and other multimedia habits. It is well known that some multimedia presentations, whether music on a CD, a movie on DVD, various television channels, etc., can contain language and explicit content not suitable or desired by certain audiences. Thus, it would be useful for a parent to know how many total hours of programming their son has watched, or what channels their daughter most frequently selects, what video game titles their son has played, and what DVD titles their daughter plays. Such information would be especially useful for parents with teenage children that may be left at home for periods of time without parental supervision. With knowledge of their children's television viewing and other multimedia habits, parents could restrict or prohibit some viewing, encourage other viewing, and generally more effectively and accurately manage their children's multimedia entertainment. Currently, however, an easy an efficient way to obtain such information is not known to exist.

SUMMARY

One aspect of the present invention involves a method of logging and reporting multimedia viewing information. The method includes the operations of obtaining viewing information about a multimedia presentation and recording the viewing information. The method also includes a provision for generating a viewing report as a function of the viewing information.

Another aspect of the present invention involves a system for logging and reporting multimedia viewing. The system includes an input logging module configured to obtain viewing information about a selected multimedia presentation. The system further includes an input log storage module configured to store viewing information about the selected multimedia presentation. Finally, the system includes a report generation module for generating a viewing report as a function of the stored viewing information.

DETAILED DESCRIPTION OF EMBODIMENTS OF THE INVENTION

Parents and others need a way to accurately track the television viewing habits of their children or others. Aspects of the present invention involve the creation, generation, or otherwise provision of television viewing report logs that can be used to generate television viewing reports. Aspects of the invention are also adapted to provide reports for other forms of multimedia entertainment, including music on CDs, movies on DVD or other formats, pay-per-view, video-on-demand, and the like. Viewing the reports will allow a parent or other adult to monitor, study, or otherwise understand a child's or other individual's multimedia viewing and entertainment habits. Further it would be possible for an adult to take some action based on the information in the log or report. For example, based on viewing reports a parent can determine whether their child is watching appropriate programming, whether the child is spending too much time in front of the television, whether an individual is tuning into required programming, etc. The parent can also use the viewing reports to adjust the settings on other parental controls (i.e. block specific programming or channels). One platform for blocking programming is described in U.S. application Ser. No. 10/971,899 titled "Apparatus and Method for Blocking Audio/Visual Programming and for Muting Audio," filed Oct. 22, 2004, which is hereby incorporated by reference herein.

Figure 1:
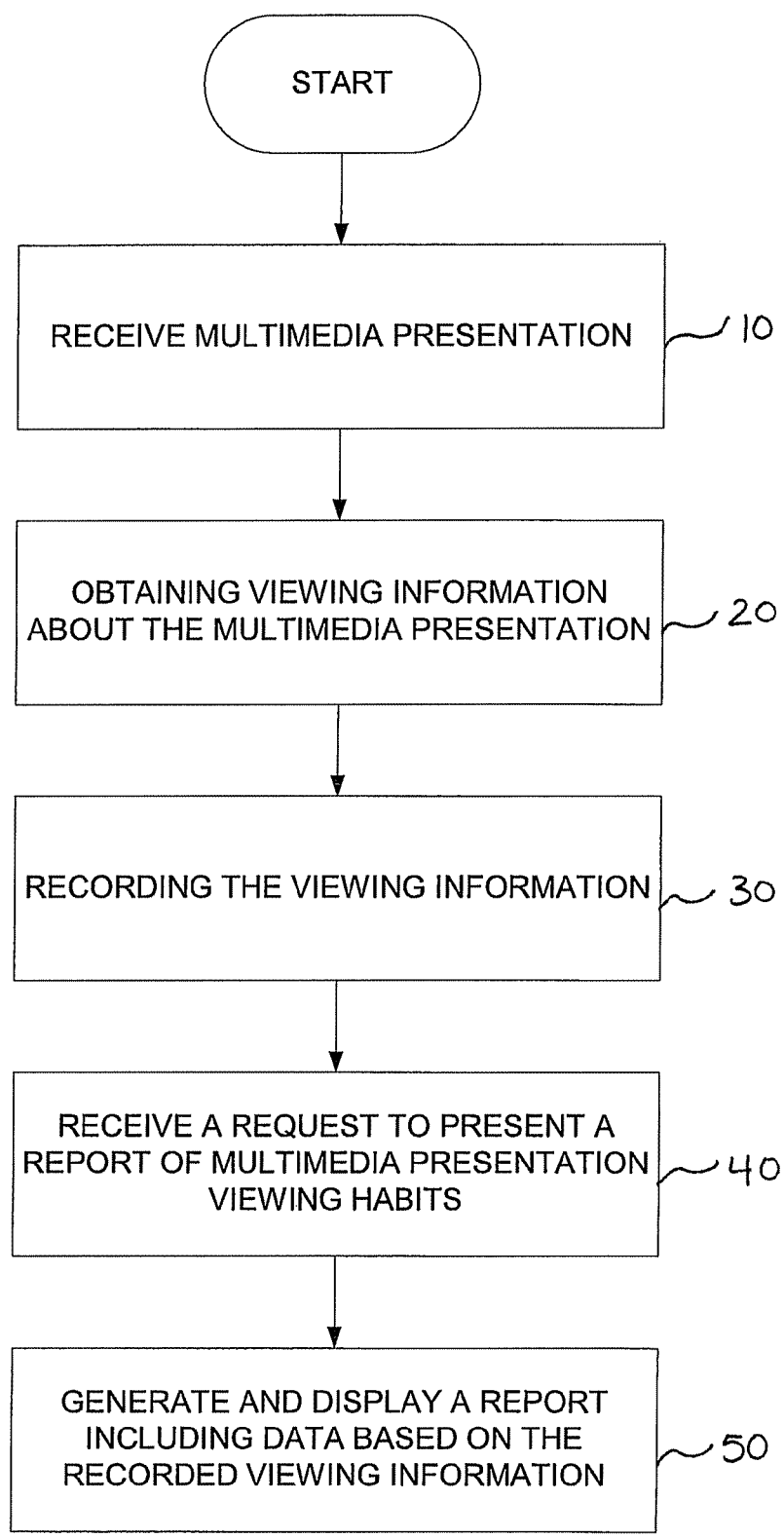
FIG. 1 is a flowchart illustrating operations involved in one method for logging and reporting multimedia presentation viewing information.

FIG. 1 is a flowchart illustrating operations of a method for logging and reporting television or other multimedia viewing information, in conformance with aspects of the present invention. The method operations may be in the form of computer executable instructions running on a processor forming a part of a stand alone computer system or integrated in a television system, cable or satellite set-top box. DVD or other media player, desk top or lap top computer, or other multimedia presentation platforms. Hereafter, embodiments of a multimedia presentation platform configured in accordance with aspects of the present invention may collectively be referred to as a "logger system". First, the logger system receives and/or detects a multimedia signal (operation 10). The multimedia signal may be a digital or analog multichannel television signal being received at a tuner, may be a signal with an MPEG encoded movie from a DVD player, may be a video-on-demand signal, or any other such signal with audio, video, hyperlinks, and/or other forms of multimedia information.

The logger system then obtains records some viewing information about the presentation of the multimedia (operations 20 and 30). The viewing information may take on various forms including an indication of play of a DVD or CD, tuning to or selecting a particular television channel, etc. The viewing information may also include other forms of information about the presentation of the multimedia, such as the time period when it was presented, the title of the multimedia, the Motion Picture Association of America rating or other rating of the multimedia, the actors in a movie, etc. This information may be extracted from a digital programming guide, such as those presented with cable and satellite systems, may be extracted from the multimedia signal itself, may be extracted from a storage medium including the multimedia (e.g., from an optical disc having a video game, DVD disc with a movie, or CD with music), may be obtained from a link to a network site (e.g., a website on the Internet such as TVGuide.com), and obtained from other sources. The viewing information may be recorded in memory forming a part of the logger system or may be recorded remotely.

After recordation of some indicia of the presentation of the multimedia, the logger system may then provide a report upon receipt of a request for such a report (operations 40 and 50). For example, a user, through on screen menus presented on television or other monitor, may use a conventional remote control unit to request a report. As will be set out in further detail below, the report may be user specific, may list all users and the viewing habits, etc. The report form and format may take on various forms, and depends upon the type of indicia that is recorded about presentation of the multimedia. A simplified example of one possible report is set forth in the table below. As can be seen from the title, this is an example of a television viewing report for Andrew. The data in the report is from Jan. 19, 2007. Column one of the table shows the times that Andrew was watching television. The middle column shows the title of the television program being watched. The third column is the television channel name and channel, and the fourth column is the rating. In this example, a parent could obtain a great deal of information about Andrew's viewing habits. Here Andrew watched a Discovery channel show about geography, which Andrew's parents may not object to. Andrew also very briefly turned on the R-rated movie "Texas Chain Saw Massacre," but turned it off after only two minutes. From this information, a parent could talk to Andrew about why he turned on the movie, but decided to turn it off after only two minutes. Finally, Andrew watched the show CSI: Crime Scene Investigation, which generally depicts the various murder cases investigated by the police and police crime labs. Depending on the age of Andrew, the parent's decision, or any number of issues, Andrew's parents, upon learning that their son watched the show, may request Andrew not to watch it again due to the mature nature of the programming. To generate this report, for play of each television program, the title of the program, time of play, channel, and the rating were stored in the log. If the logger system includes a network connection, it is possible to provide a URL or other network address to a web page or other on-line information about a program listed in the report. For example, a user could point and click on the title "CSI: Crime Scene Investigation" and be linked to the web page at "http://www.cbs.com/primetime/csi/" which is the http address for the CBS web page for the show CSI.

Jan. 19, 2007 Television Viewing Log for Andrew

| Viewing Time | Television Program | Channel | Rating |
| --- | --- | --- | --- |
| 7:00 PM-7:30 PM | Discover Atlas | Discovery (12) | G |
| 7:30 PM-7:32 PM | Texas Chain Saw Massacre | HBO (253) | R |
| 8:15 PM-9:00 PM | CSI: Crime Scene Investigation | CBS (4) | NA |

Figure 2:
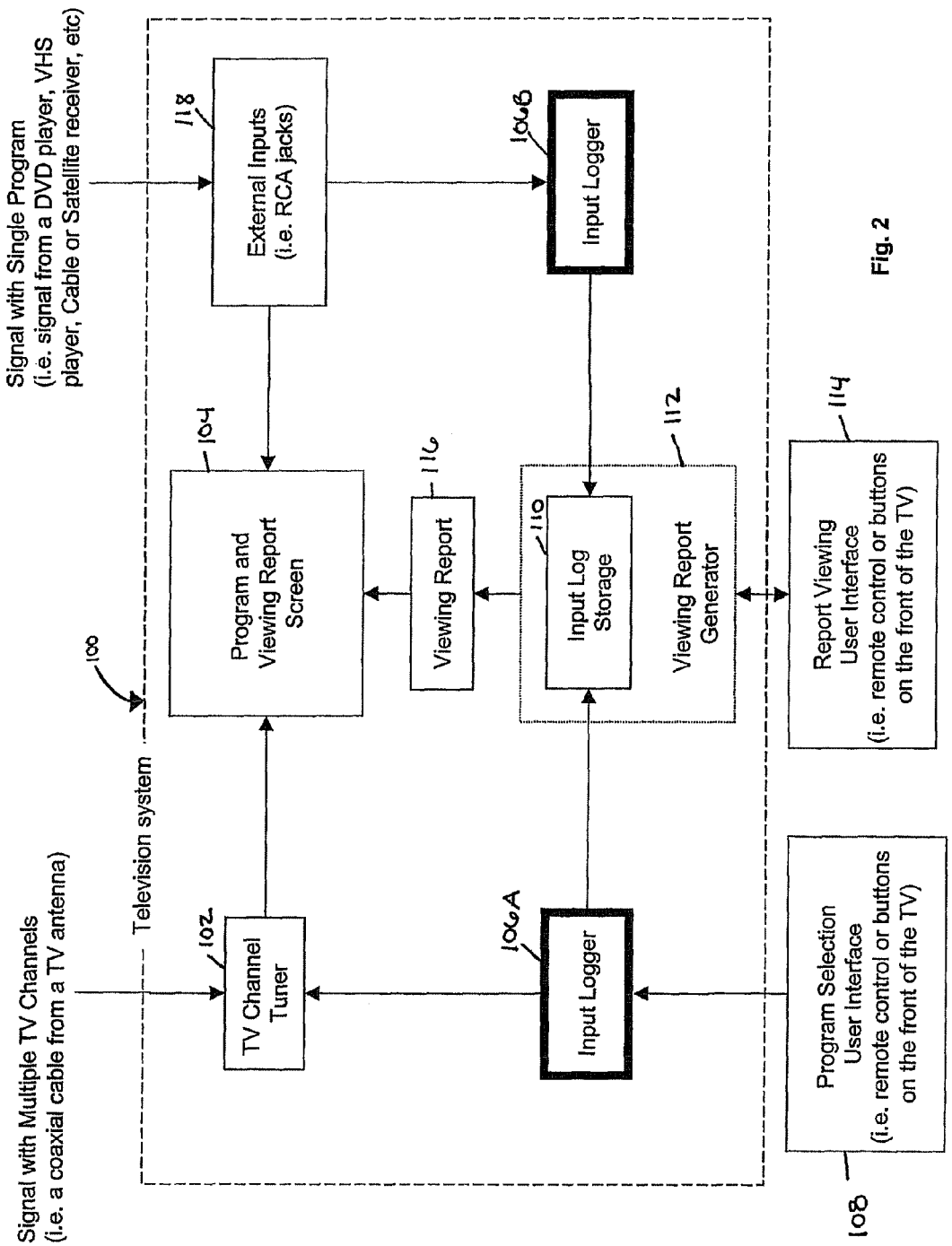
FIG. 2 is a block diagram illustrating a first system for logging and reporting multimedia presentation viewing information.

FIG. 2 is a block diagram of a first television logging and viewing system integrated within a television system (logger system). The television system includes a television channel tuner 102. The tuner 102 is in operable communication with a program and viewing report screen 104, which may be a conventional television viewing screen, whether analog, digital, cathode ray tube, liquid crystal display, plasma, etc. The tuner 102 is further in operable communication with an input logger 106 configured to intercept and record (log) channel selection inputs received from a user interface 108, whether from a remote control, integrated selection buttons, etc. Logging selection inputs include data (viewing indicia) relevant to identifying a selected channel and the time it was selected. This data alone is sufficient to generate a report with time and channel information. The input logger 106 transmits the channel selection commands to the tuner as well as an input log storage 110 (some form of memory, e.g., RAM, DRAM, SRAM, etc.) that is configured to record the channel selection data received from the input logger. The logger 106 may be a standalone processor with appropriate computer executable instructions or integrated within conventional television system processing components, like a central processing unit.

The input log storage 110 is a part of or in operable communication with a viewing report generator 112. The viewing report generator 112 may be a standalone processor with appropriate computer executable instructions or section of code running within conventional television processing components. The viewing report generator 112 is in communication with a report viewing user interface 114, which may be in the form of a remote control, separate or integrated with the program selection remote, in the form of input medium, such as a keypad coupled with the television, or may be in the form of menu selections displayed on the viewing report screen and able to receive commands by way of the remote. Upon receiving an appropriate signal from the report viewing user interface 114, the viewing report generator 112 accesses information stored in the input log and generates a report that is displayed on the program and viewing report screen.

By way of a user identification and/or password, it is possible to log viewing information on a user-by-user basis, and subsequently generate reports on a user-by-user basis. Indicia of a particular user may be provided or required at any time and may take many forms. For example, to access any programming or view reports, a user may be required to identify himself. Identification can be achieved in many ways, such as through a user ID or password, and other recognition technologies. Further, the password may be a form of user identification, not necessarily requiring a separate user identification. For example, to access the system, a user enters a code, which serves both to identify the user and allow access to the system.

Still referring to FIG. 2, the television system 100 may further include some form of a port 118, external jack, or the like, configured to engage a corresponding connector associated with a cable or other transmission medium adapted to transmit signals from a DVD player, VHS player, set-top box, satellite receiver, cable receiver, etc. The port 118 is adapted to provide a signal, directly or indirectly as the case may be, to the program and viewing report screen for presenting the video from the external device. The port is further in communication with a second input logger 106B, which may be the same unit as the first input logger 106A or a separate unit. The second input logger receives the signal from the port and processes the signal being received in order to extract information concerning the signal, such as the channel, movie title, and program guide information associated with the channel. The second input logger is also in communication with the input log storage 110 (or loggers as the case may be), such that it may be employed to generate a viewing report 116.

It is also possible to capture or extract other information or indicia of the multimedia presentation. The information extracted can be in any combination in a particular embodiment. Examples of other information embodiments that may be captured include the start and end time associated with the use of a device, such as a DVD player, VHS player, video game console, stereo receiver, etc. In such an embodiment, the logger 106 is arranged to monitor a signal from any devices coupled with the system. For example, the logger 106 may be placed in the communication stream between various components in a theater system that includes a television system. Further, the logger 106 may be integrated with various home theater components, such as an audio video receiver and amplifier that are coupled with a television system. Further, the logger 106 may be integrated with various theater components, such as the audio video receiver. In such an arrangement or any arrangement where the input logger has access to various signal types, the logger 106 may analyze a signal to determine its source, e.g., DVD player output, cable signal, etc. Alternatively, the logger 106 may determine which signal line is active. For example, in an A/V embodiment, the logger 106 is configured to determine which A/V DVD outputs and/or inputs are active. When the logger 106 is separate from the A/V or some other hub component, an on-screen menu may be employed to associate lines with system components.

Figure 3:
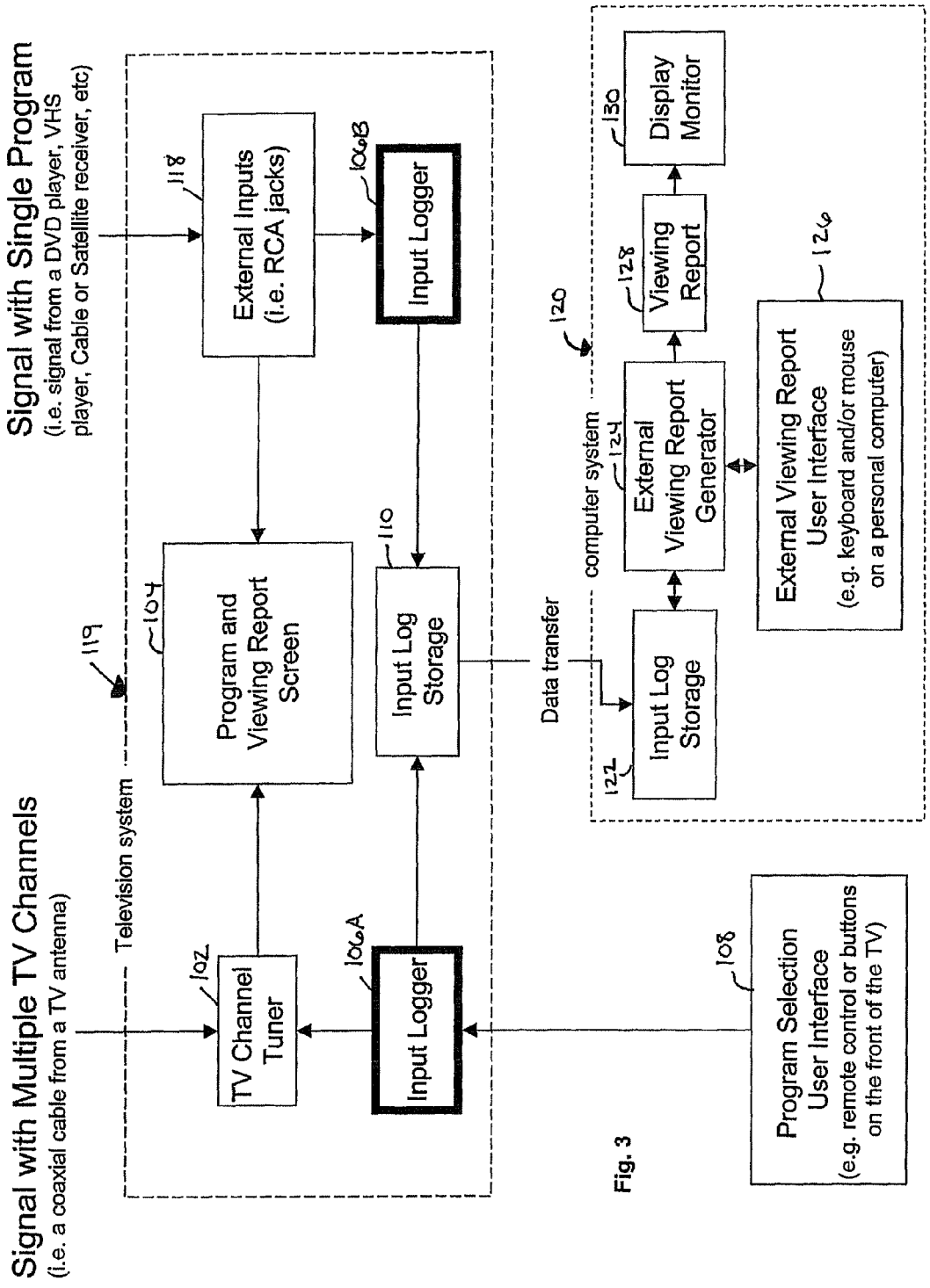
FIG. 3 is a block diagram illustrating a second system for logging and reporting multimedia presentation viewing information.

FIG. 3 is a block diagram of a second television logging and viewing system 119 including a television system component and a computer system component 120. The term "tuner" in this application should be construed to refer to any device capable of selecting one discrete television signal from a plurality of signals provided on different channels. The signal may be analog or digital and be broadcast or provided by way of cable, satellite, pocket network, or other means. Accordingly, "tuner" is not meant to only refer to a convention tuner that selects between broadcast television channels. As with the first embodiment, the television system includes a television channel tuner 102. The tuner 102 is in operable communication with a program viewing screen 104, which may be a conventional television viewing screen, whether analog, digital, cathode ray tube, liquid crystal display, plasma, etc. The tuner 102 is further in operable communication with an input logger 106 configured to intercept and record (log) channel selection inputs received from a user interface, whether from a remote control, integrated selection buttons, etc. The input logger 106 transmits the channel selection commands to the tuner 102 as well as an input log storage 110 (some form of electronic memory) that is configured to record the channel selection data received from the input logger 106.

Like the embodiment of FIG. 2, the television system 119 of FIG. 3 may further include some form of port, external jack, or the like, configured to engage a corresponding connector associated with a cable or other transmission medium adapted to transmit signals from a DVD player, VHS player, set-top box, satellite receiver, cable receiver, etc. The port is adapted to provide a signal, directly or indirectly as the case may be, to the program and viewing report screen 104 for presenting the video from the external device. The port is further in communication with a second input logger 106, which may be the same as the first input logger or a separate implementation. The second input logger 106 receives the signal from the port and processes the signal in order to extract information concerning the program or other multimedia transmitted by way of the signal, such as the channel, movie title, program guide information associated with the program, etc. The second input logger 106 is also in communication with the input log storage unit (or units as the case may be), such that it may be employed to generate a viewing report 128.

Still referring to FIG. 3, the computer system 120 is in operable communication with the television system 119, which may be through a network connection, wired connection, wireless connection, etc. In the implementation of FIG. 3, the television system and computer system 120 may collectively form the logging system. The computer system 120 includes a second input log storage 122 adapted to receive the information stored in the first input log storage 110 (of the television system). The information may be periodically sent to the second input log storage 122, sent on a request basis, sent on a schedule, or otherwise transmitted regularly or intermittently, whether automatically or upon receiving a transmit signal, etc. The second input log storage 122 is a part of or in operable communication with a viewing report generator 124. The viewing report generator 124 is in communication with a report viewing user interface 126, which may be in the form of a remote control, in the form of input medium, such as a keypad, keyboard, etc., supported on the computer system 120 or in communication with the computer system, or may be in the form of menu selections displayed on a display 130 in communication with the viewing report generator 124. Upon receiving an appropriate signal from the report viewing user interface 126, the viewing report generator 124 generates a report that is displayed on a display monitor operably connected with the computer system. Like the embodiment of FIG. 2, by way of user identifications and passwords, it is possible to log viewing information on a user-by-user basis, and subsequently generate reports on a user-by-user basis.

Figure 4:
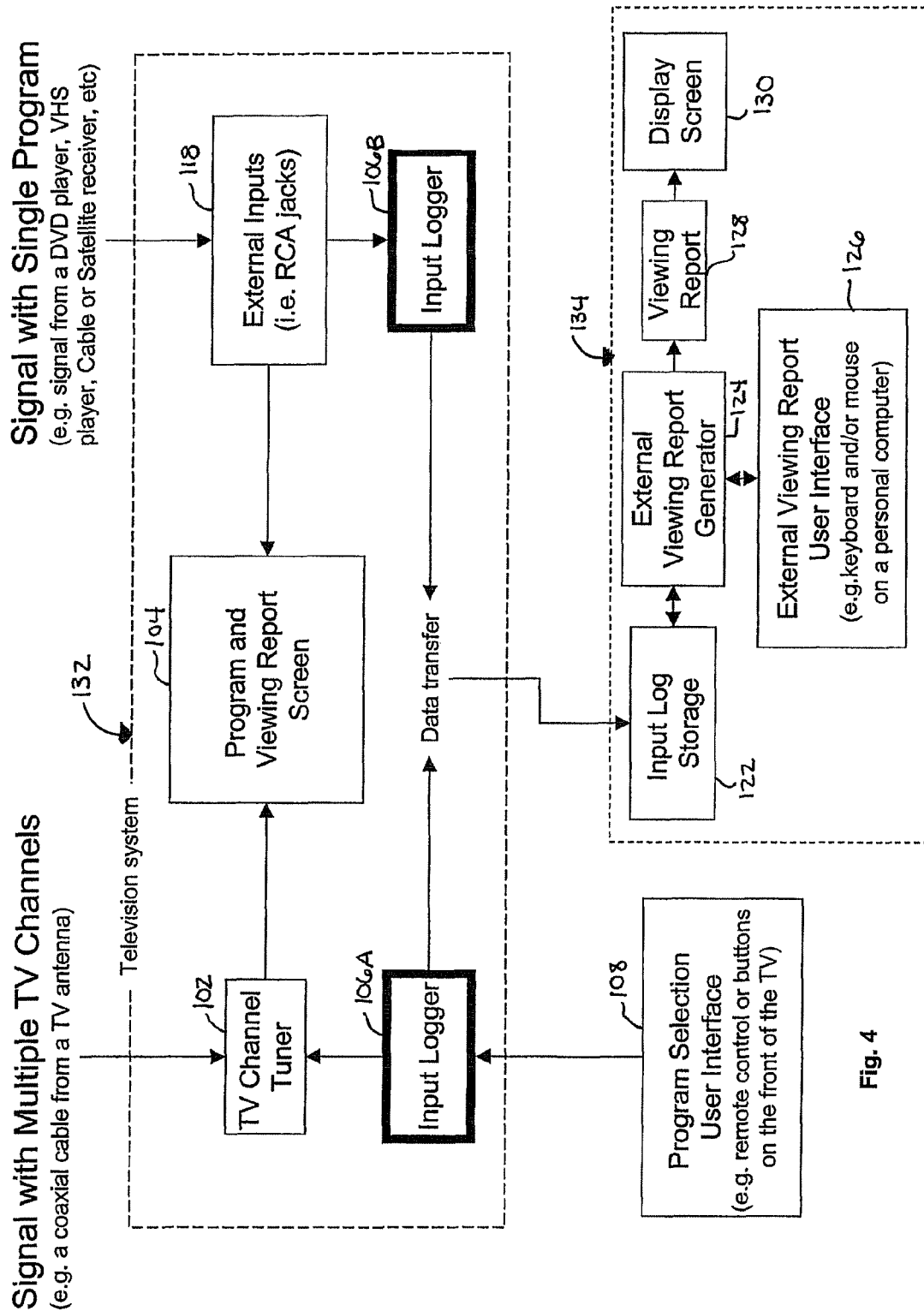
FIG. 4 is a block diagram illustrating a third system for logging and reporting multimedia presentation viewing information.

FIG. 4 is a block diagram of a third television logging and viewing system 132 including a television system component and a computer system component 134. The third embodiment is similar to the second embodiment, with the primary difference being that there is only one input log storage in the computer system. Thus, log information from either the first or second input logger 106 is transmitted from the television system 132 to the input log storage 110, which is in the computer system portion of the logging system.

Figure 5:
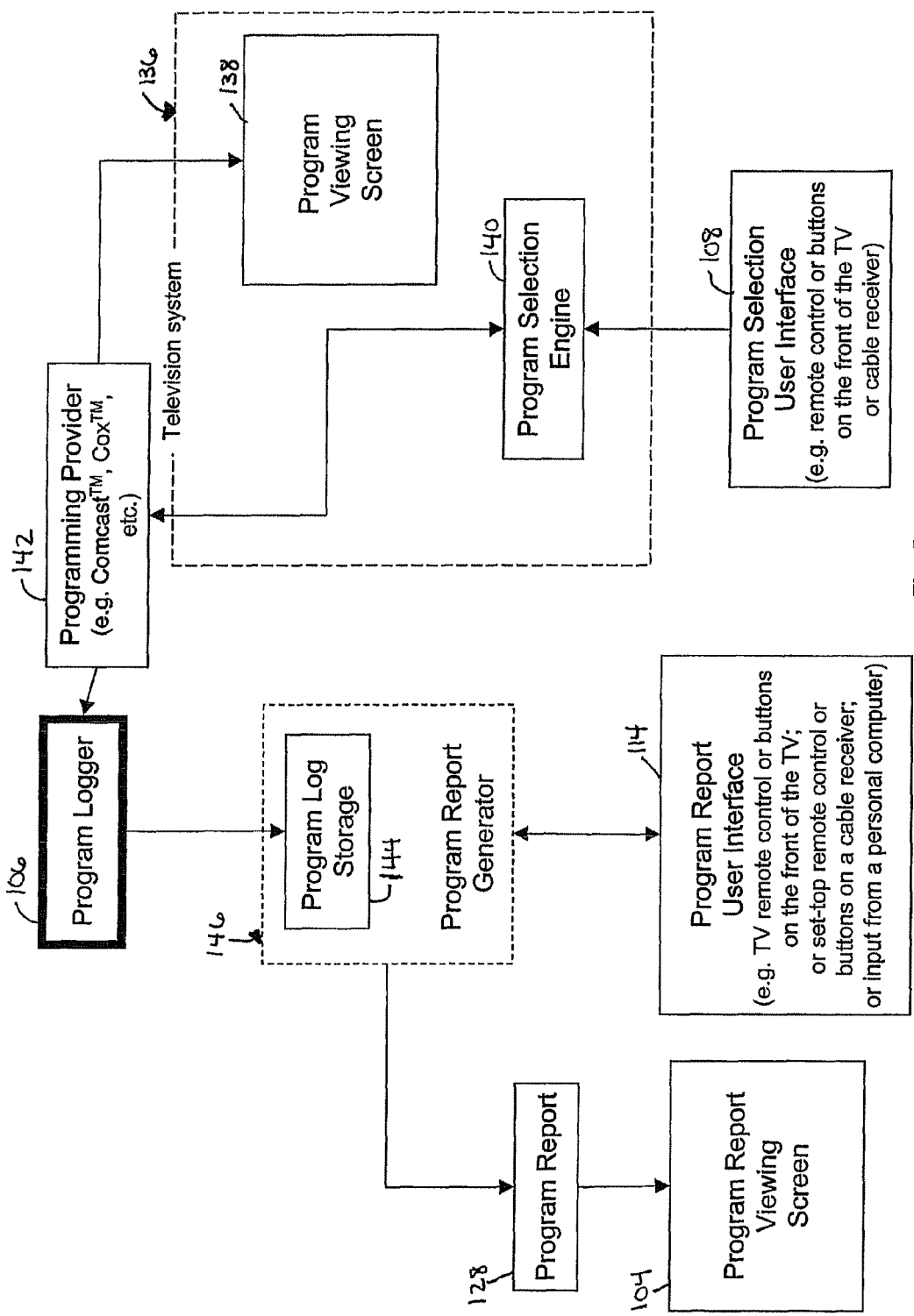
FIG. 5 is a block diagram illustrating a second system for logging and reporting multimedia presentation viewing information.

FIG. 5 is a block diagram of a fourth television logging and viewing system 136. In this example, the television viewing system includes a display 138 and a program selection engine 140, which may be a tuner or other processing or logic structure adapted to receive a programming signal from a programming provider 142 and decode or otherwise process the signal for display. The programming provider 142 may be a satellite or cable provider and the programming signal may be received by a set-top box or other processing platform provided in operable communication with the television system 136. In one particular example, the programming signal may be commensurate with a particular program, such as an on-demand, pay-per-view or the like. Such a particular program signal is distinguished from a signal containing a plurality of programs where a tuner or other processing arrangement extracts a particular program signal for display.

In any of the embodiments set forth herein, including the embodiment of FIG. 5, the television system 136 may include a personal or mobile computer environment. For example, the logger 106 may be a set of computer readable instructions adapted for execution by the personal or mobile computer, or wireless communication device (e.g., phone, PDA, etc.). By way of a Windows™ media player, Real™ player, or other type of player, the personal computer may be configured to display some type of audio visual programming, such as movie files in any possible format retrieved from some network location or website, such as Google™, Yahoo™, etc. The embodiment of FIG. 5 as well as others may also be employed in an IPTV environment. It is also possible to employ a logger system to log Internet viewing of video clips, such as clips provided from Yahoo™, YouTube™, and other web sites. In such a situation, the report may include a link to the actual clip that was viewed. Thus, the report is a list of links. When a parent selects a link they are able to view the same clip.

In the embodiment of FIG. 5, when a user makes a request for a unique program delivered by way of a program specific signal, the request is logged in a program logger 106 remote from the television system 136. The program logger 106 may be integral to a server platform arranged to provide the program specific signal. The program logger 106 is in communication with a program log storage 144 and report generator 146, also at or associated with the server. The program log storage 144 and report generator 146 may be arranged to communicate with the set-top box, such that a user may be able to request a report by way of a set-top box remote control and view reports on the television screen. Alternatively, the program log storage 144 and report generator 146 may be arranged to receive commands from a web site interface, and provide reports on a web site.

Aspects or features of any of the various embodiments may be combined or interchanged to provide a different embodiment. For example, a fifth embodiment might employ aspects of the embodiments of FIGS. 2 and 5 to allow for tracking of signals passing through a tuner as well as discrete program signals, e.g., video-on-demand, from a provider.

Logging viewing information may involve many different combinations of information indicative of television or other multimedia viewing. Logging may involve storing which television programs have been watched or some indication thereof, such as viewing start time, viewing end time, viewing date, channel, program title, program duration, parental rating, etc. Obtaining logging information may be achieved in various ways, including storing remote control and/or front panel button presses. The log of all the button presses can be used to detail what channel was watched, when, and what program was on. The "button press log" could also be aligned with a programming database (e.g., a TV Guide-like programming database) to provide more details about the individual programs. From the logged information, reports in various formats may be generated.

In a video-on-demand, digital video recorder (such as TiVo) or other environments, it is possible to log all content delivery. In such an environment, a log may be generated anytime a program for viewing is requested. As such, in one implementation, viewing information may include some or all content being viewed. The recorded programs could be then be monitored later by a parent. The information could be indexed with searchable information, similar to a guide database, for easy searching. In another implementation, it is possible to log the close captioning for any programs being viewed. A log of close captioning may be used to generate program details, may be formatted for searchability, may be searched for reference to unsuitable language, searched for language indicative of unsuitable images, etc.

As shown in the embodiments of FIGS. 2-5, it is possible to store the logging information in local memory of the logging system, at an attached set-top box, or remotely at a computer system. Further, viewing log information may be stored in remote memory of a Video-On-Demand (VOD) server or on an Interactive Programming Guides (IPG) server.

Log information may be provided in a report or other various forms. For example, logging information in the form of a report may be provided on a display. Further, reports may be sent to a user via email, in paper form, or accessible at a network location, such as a web site. The report or a modified version of the report may also be transmitted to a mobile computing device, such as a cell phone with text viewing capability, a PDA, a lap top with a wireless network connection or the like. For example, the report may be contained in the body of an email, and it may be transmitted either intermittently or in real time. So, for example, it is possible to configure the system so that whenever your child turns on the TV at home, the parent receives an email indicating the time when the program was turned on and the name of the program. It also possible to provide for remote access to a blocking application such that the parent can block a particular program when they receive the report.

Various embodiments may further involve other features and implementations. For example, an embodiment may be configured to link to program viewing information provided by a third party that has identified, categorized, described or otherwise provided information concerning content for audio visual presentations. In one example, a third party may provide content information concerning various television programs. The content information may include some form of report concerning a program with information involving the type of scenes in the program. For example, the information may indicate that program ABC included three scenes with violence, four scenes with sexual content, and ten instances of strong profanity. Content categories identified by the third may include some or all of those set forth in e-mail, which is hereby incorporated by reference herein. During viewing of a report, links may be provided to the content report for each program watched by a user. Thus, if the report indicates that program ABC was viewed, then a link is provided on the report to the third party site, and particularly to the content information concerning program ABC.

Functionality also may be provided for a user to block certain programming. The functionality may be set forth as an on-screen command as part of the report that allows a user to block future instances of a certain program. The blocking functionality may be as set forth in the '899 application referenced above. So, for example, if a report indicates a certain program contains excessive violence, then a parent may block future instances of that program. Blocking may be established on a user basis.

Embodiments may be configured to track a particular user's viewing information (i.e. have unique user logins so that the log information is associated with a specific user identification). In such an embodiment, reports may be established on a user-by-user basis. Whether on a user-by-user basis, with respect to all access, or otherwise, a report and logger of some embodiments may be configured to display or otherwise provide information concerning the total amount of time spent watching television, (e.g., the TV was on for 8 hours this week), playing video games, or otherwise engaged in viewing, listening, or participating in some form of multimedia presentation, whether watching television, DVDs, or the like.

Embodiments may be configured to log advertising detail that was part of programming or associated with programming and log if a parental password has been changed. As discussed above, embodiments may be configured to log viewing information for devices connected to the television (i.e. a DVD player, VHS machine, or Game Console). The log can capture any information that is available from these connected devices (i.e. the MPAA rating of programs watched through the connected device). Further, the viewing log can automatically trigger certain actions, such as generating and sending an email every time the parental password is entered, or a program with a certain parental rating is being viewed, etc.

While the disclosed embodiments are described in specific terms, other embodiments encompassing principles of the invention are also possible. Further, operations may be set forth in a particular order. The order, however, is but one example of the way that operations may be provided. Operations may be rearranged, modified, or eliminated in any particular implementation while still conforming to aspects of the invention. Embodiments within the scope of the present invention also include computer readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, DVD, CD ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media. Computer-executable instructions comprise, for example, instructions and data which cause a general purpose computer, special purpose computer, or special purpose processing device to perform a certain function or group of functions.

Those skilled in the art will appreciate that aspects of the invention may be practiced in network computing environments with many types of computer system configurations, including personal computers, hand-held devices, multi-processor systems, microprocessor based or programmable consumer electronics, network PCs, minicomputers, mainframe computers, and the like. Various embodiments discussed herein including embodiments involving a satellite or cable signal delivered to a set-top box, television system processor, or the like, as well as digital data signals delivered to some form of multimedia processing configuration, such as employed for IPTV, or other similar configurations can be considered as within a network computing environment. Further, wirelessly connected cell phones, a type of hand-held device, are considered as within a network computing environment. For example, cell phones include a processor, memory, display, and some form of wireless connection, whether digital or analog, and some form of input medium, such as a keyboards, touch screens, etc. Naturally, hand-held devices, which might also be referred to as portable or mobile devices, apply to logging of content that is downloaded/streamed onto a device from a content provider (e.g., Yahoo™, ESPN™, ABC™, etc.) and viewed on the display and/or heard on speakers. Hand-held computing platforms can also include a tuner that tunes one multimedia signal from a plurality of multimedia signals, for example a cell phone that can receive a broadcast television signal and has a tuner that can isolate a single broadcast program for viewing or listening. Examples of wireless connection technologies applicable in various mobile embodiments include, but are not limited to, radio frequency, AM, FM, cellular, television, satellite, microwave, WiFi, blue-tooth, infrared, and the like. Hand-held computing platforms do not necessarily require a wireless connection. For example, a hand-held device may access multimedia from some form of memory, which may include both integrated memory (e.g., RAM, Flash, etc) as well as removable memory (e.g., optical storage media, memory sticks, flash memory cards, etc.) for playback on the device. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

I hereby claim:

1. A method of logging and reporting multimedia viewing information comprising:
    in a multimedia computing system comprising at least one processor in communication with at least one computer readable storage media, the computer readable storage media including computer executable instructions configured to perform the following operations:
    registering a first user to the multimedia computing system;
    registering a second user to the same multimedia computing system;
    providing the first registered user access to the multimedia computing system;
    obtaining viewing information about a multimedia presentation accessed by the first user, the viewing information including an indicia of a content of the multimedia presentation, the multimedia presentation accessed through an Internet address;
    recording the viewing information including the Internet address; and
    providing for generation of a viewing report as a function of the viewing information, the viewing report accessible by the second user of the multimedia computing system upon registering to the multimedia computing system and providing information concerning the multimedia presentation accessed by the first user and information concerning the content of the multimedia presentation based on the indicia of the content of the multimedia presentation, the viewing report including a selectable link to the Internet address for accessing the viewed multimedia presentation.

2. The method of claim 1 wherein the operation of recording the viewing information comprises:
    receiving a selection of the multimedia presentation; and
    recording viewing information about the multimedia presentation, the viewing information including an indicia of the selection of the multimedia presentation.

3. The method of claim 2 wherein:
    the operation of receiving a selection of the multimedia video signal comprises receiving a selection of the multimedia presentation initiated from a remote control device;
    the multimedia presentation comprises a television program received from one of a plurality of channels; and
    further comprising:
    receiving a selection of one of the plurality of channels; and
    the viewing information comprises a time of selection and an indicia of the selected program.

4. The method of claim 1 further comprising:
    receiving a signal providing data for the multimedia presentation;
    analyzing the data to extract the viewing information, the viewing information includes a source of the signal, the source comprises at least one of a DVD player, a digital video recorder device, a satellite set top box, a cable set top box, a video game counsel, a VHS player, and a television broadcast; and
    recording an indicia of the source of the signal.

5. The method of claim 1 wherein the operation of obtaining viewing information comprises:
obtaining programming guide information; and
wherein the viewing report includes at least one of a viewing start time, a viewing end time, a viewing date, a channel, a program title, a program duration, and a parental rating.

6. The method of claim 1 further comprising:
at a server, receiving a request for the viewing report from a client device; and
transmitting the viewing report to the client device.

7. The method of claim 1 further comprising:
transmitting the viewing information to a remote storage device.

8. The method of claim 1 wherein the multimedia presentation comprises a television program, and further comprising:
providing for selecting the television program presented on a channel selected from a plurality of channels; and
receiving additional programming information concerning the selected television program.

9. The method of claim 1 further comprising:
providing for customizing the generation of the viewing report as a function of providing the first registered user access to the multimedia computing system.

10. The method of claim 1 further comprising:
transmitting the viewing report to a remote device for display.

11. The method of claim 10 wherein the remote device is a wireless communication device.

12. The method of claim 1 further comprising:
receiving a signal to block presentation of the multimedia presentation.

13. The method of claim 12 further comprising:
receiving a signal by way of a wireless network from a wireless device distinct from the multimedia computing system to block presentation of the multimedia presentation.

14. The method of claim 1 further comprising:
processing log-in information from a first user and subsequently obtaining viewing information indicative of a multimedia selection by the first user; and
in response to the log-in and multimedia selection, automatically sending an electronic communication to an electronic communication address for a second user, the electronic communication including information indicative of the first user and the multimedia content selection.

15. The method of claim 14 wherein the electronic communication further includes an indicia of a content rating of the multimedia selection.

16. The method of claim 1 wherein the indicia of the content of the multimedia information includes a link to a network site providing information concerning the content of the multimedia presentation.

17. The method of claim 1 wherein the first user has a first password for accessing the multimedia computing system and the second user has a second password for accessing the multimedia computing system, the second password being distinct from the first password, and the method further comprising:
generating an electronic communication to the second user if the second password is changed.

18. A system for logging and reporting multimedia viewing comprising:
a multimedia computing system comprising at least one processor in communication with at least one computer readable storage media, the computer readable storage media including computer executable instructions configured to implement:
a registration module configured to register a first user and a second user with a multimedia computing system;
an input logging module configured to obtain viewing information about a multimedia presentation selected by the first user, the multimedia presentation accessed through an Internet address;
an input log storage module configured to store viewing information about the selected multimedia presentation including the Internet address; and
a report generation module for generating a viewing report as a function of the stored viewing information, the viewing report accessible by the second user of the multimedia computing system upon registering to the multimedia computing system and providing information concerning the multimedia presentation accessed by the first user and information concerning content of the multimedia presentation, the viewing report further including a selectable link to the Internet address for accessing the viewed multimedia presentation.

19. The system of claim 18 wherein:
the input logging module is further configured to receive a transmission of a selection of the multimedia presentation; and
the viewing information includes an indicia of the selection of the multimedia presentation; the selected multimedia presentation comprises a television channel selected with a remote control device.

20. The system of claim 19 wherein:
the selected multimedia presentation comprises a television program received from one of a plurality of channels; and
the viewing information comprises a time of selection and an indicia of the selected television program.

21. The system of claim 18 further comprising:
a communication interface configured to receive a signal providing data for the multimedia presentation; and
the input logging module configured to analyze the data to extract the viewing information.

22. The system of claim 21 wherein:
the viewing information includes a source of the signal, the source comprises at least one of a DVD player, a digital video recorder device, a satellite set top box, a cable set top box, a video game counsel, a VHS player, and a television broadcast; and
the input log storage module is configured to store an indicia of the source of the signal.

23. The system of claim 18 wherein:
the viewing information comprises programming guide information; and
the report includes at least one of a viewing start time, a viewing end time, a viewing date, a channel, a program title, a program duration, and a parental rating.

24. The system of claim 18 further comprising:
a server including the input log storage module and configured to receive a request for viewing the report from a client device, the server further including the report generation module configured to transmit the viewing report to the client device.

25. The system of claim 18 wherein the multimedia presentation comprises a television program, and further comprising:
a tuner configured to provide for selecting the television program presented on a channel selected from a plurality of channels; and the input logger configured to receive additional programming information concerning the selected television program.

26. The system of claim 18 further comprising:
a module configured to receive an indicia of a user; and
the report generation module configured to provide a customized viewing report as a function of the user indicia.

27. The system of claim 18 further comprising:
a blocking application configured to receive a signal to block presentation of the multimedia presentation, the blocking application further configured to block presentation of the multimedia presentation.

28. The system of claim 18 further comprising:
a first module that processes log-in information from a first user and subsequently obtains viewing information indicative of a multimedia selection by the first user; and
a second module that, in response to the log-in and multimedia selection, automatically sends an electronic communication to an electronic communication address for the second user, the electronic communication including information indicative of the first user and the multimedia content selection.

29. The system of claim 28 wherein the viewing report further comprises a link to a network site providing information concerning the content of the multimedia presentation.

30. The system of claim 18 wherein the first user has a first password for accessing the multimedia computing system and the second user has a second password for accessing the multimedia computing system, the second password being distinct from the first password, and the system further comprising; a third module that generates an electronic communication to the second user if the second password is changed.

* * * * *